United States Patent
Kashihara et al.

(10) Patent No.: US 9,290,625 B2
(45) Date of Patent: Mar. 22, 2016

(54) AQUEOUS RESIN COMPOSITION AND METHOD OF PRODUCING THE SAME

(75) Inventors: Kenji Kashihara, Takasago (JP); Hideo Matsuoka, Takasago (JP)

(73) Assignee: TOYO BOSEKI KABUSHIKI KAISHA, Osaka (JP)

( * ) Notice: Subject to any disclaimer, the term of this patent is extended or adjusted under 35 U.S.C. 154(b) by 780 days.

(21) Appl. No.: 11/995,853

(22) PCT Filed: Jul. 21, 2006

(86) PCT No.: PCT/JP2006/314507
§ 371 (c)(1),
(2), (4) Date: Feb. 15, 2008

(87) PCT Pub. No.: WO2007/011033
PCT Pub. Date: Jan. 25, 2007

(65) Prior Publication Data
US 2008/0262137 A1    Oct. 23, 2008

(30) Foreign Application Priority Data
Jul. 22, 2005  (JP) .............................. 2005-212537

(51) Int. Cl.
| | | |
|---|---|---|
| C08K 5/06 | (2006.01) | |
| C08J 3/05 | (2006.01) | |
| C08L 51/06 | (2006.01) | |
| C09D 151/06 | (2006.01) | |
| C09J 151/06 | (2006.01) | |
| C08L 71/02 | (2006.01) | |

(52) U.S. Cl.
CPC ... C08J 3/05 (2013.01); C08K 5/06 (2013.01); C08L 51/06 (2013.01); C09D 151/06 (2013.01); C09J 151/06 (2013.01); C08F 2800/10 (2013.01); C08J 2351/06 (2013.01); C08L 71/02 (2013.01)

(58) Field of Classification Search
CPC .............. C08J 3/05; C08K 5/06; C08L 51/06; C08L 23/28; C09D 151/06; C09J 151/06; C08F 8/44; C08F 8/22; C08F 255/02; C08F 255/04; C08F 222/06
USPC .................... 524/376, 556, 570, 576
See application file for complete search history.

(56) References Cited

U.S. PATENT DOCUMENTS

| | | | |
|---|---|---|---|
| 3,306,869 A | | 2/1967 | Lahr et al. |
| 3,429,842 A | | 2/1969 | Wolstoncroft |
| 4,997,882 A | * | 3/1991 | Martz et al. ..................... 525/65 |
| 5,319,032 A | * | 6/1994 | Martz et al. .................. 525/301 |
| 5,559,176 A | | 9/1996 | Namba et al. |
| 5,728,767 A | * | 3/1998 | Kanetou et al. ............... 524/504 |
| 5,863,646 A | * | 1/1999 | Verardi et al. ................ 428/323 |
| 6,277,912 B1 | * | 8/2001 | Ashihara et al. ................ 525/65 |
| 6,344,500 B1 | * | 2/2002 | Ogawa et al. ................. 523/407 |
| 6,777,096 B2 | | 8/2004 | Shiba et al. |
| 7,511,107 B2 | | 3/2009 | Fechtenkötter et al. |
| 2003/0187128 A1 | * | 10/2003 | Shiba et al. .................... 524/556 |
| 2003/0194500 A1 | * | 10/2003 | Masuda et al. ............. 427/407.1 |

FOREIGN PATENT DOCUMENTS

| | | |
|---|---|---|
| DE | 10056264 A1 | 5/2001 |
| EP | 1354911 A1 | 10/2003 |
| EP | 1361248 A1 | 11/2003 |
| EP | 1632530 A1 | 3/2006 |
| JP | 3-182534 A | 8/1991 |
| JP | 5-59236 A | 3/1993 |
| JP | 6-73250 A | 3/1994 |
| JP | 9-506658 A | 6/1997 |
| JP | 10-231402 A | 9/1998 |
| JP | 10-298233 A | 11/1998 |
| JP | 2003-27011 A | 1/2003 |
| JP | 2003-147088 A | 5/2003 |
| JP | 2003-261726 A | 9/2003 |
| JP | 2003-327761 A | 11/2003 |
| JP | 2005-008813 A | 1/2005 |
| JP | 2005-36076 A | 2/2005 |
| JP | 2005-126482 A | 5/2005 |
| WO | WO 2004/104090 A1 | 12/2004 |

* cited by examiner

*Primary Examiner* — Ling Choi
*Assistant Examiner* — Marie Reddick
(74) *Attorney, Agent, or Firm* — Mots Law, PLLC

(57) ABSTRACT

An aqueous resin composition that can provide excellent properties using a high molecular weight resin and less amount of surfactant, and also that does not require a complicated production procedure, is provided. The aqueous resin composition is obtained by heating and dissolving 100 parts by mass of acid-modified chlorinated polyolefin with an average molecular weight of 37,000 to 150,000 in the presence of 2 to 30 parts by weight of a surfactant, 10 to 50 parts by mass of a glycol ether-based compound that satisfies general formula (1) shown below, and 150 to 425 parts by mass of water, and then dispersing this with a basic compound that has been added at a ratio of 1 to 4 chemical equivalents per carboxyl group of the acid-modified chlorinated polyolefin. General Formula (1) $C_4H_9-(OCH_2CH_2)_n-OH$ n: an integer from 1 to 4.

3 Claims, No Drawings

AQUEOUS RESIN COMPOSITION AND METHOD OF PRODUCING THE SAME

TECHNICAL FIELD

The present invention relates to aqueous resin compositions used for the protection of polyolefin resins such as polypropylene, and for aesthetics.

BACKGROUND ART

Polyolefin resins are generally relatively inexpensive and have excellent properties, such as resistance to drugs, water, and heat, and are used in a wide array of fields as material for automobile parts, electronic components, building material, wrapping film, and the like. Polyolefin resins are, however, crystalline and non-polar and thus difficult to apply and adhere. For this reason, chlorinated polyolefins, which bind polyolefin resin tightly, have been used as a binder resin in order to apply and adhere such hard-to-adhere polyolefin resins.

For the most part, however, these binder compositions are used in a dissolved form in organic solvents such as toluene or xylene, and thus a large amount of the organic solvent is released into the air during application, which has raised concerns with regard to environment pollution.

Accordingly, aqueous resin compositions that contain chlorinated polyolefin and surfactant conventionally have been proposed as polyolefin resin compositions that can be dissolved without the use of organic solvent (see Patent Documents 1 and 2)

Patent Document 1 discloses a method of heating a mixture of polyvalent alcohol and a surfactant together, adding a chlorinated polyolefin resin and heating further, and then adding a primary, secondary, or tertiary amine and mixing and melting these while adding water gradually to the melted mass that is formed in order to obtain a desired aqueous resin composition.

Patent Document 2 discloses a method of mixing, heating, and stirring of a chlorinated polyolefin resin, a surfactant, a primary, secondary, or tertiary amine, and water in order to obtain a desired aqueous resin composition.

However, both of these conventional aqueous resin compositions use a resin with a low molecular weight, and thus have the problem that the aqueous resin compositions do not realize their expected properties.

Further, in the case of the aqueous resin compositions shown in Patent Document 1, water is added to the melted mass gradually in order to obtain the desired composition, and this requires a complicated dilution procedure.

Patent Document 1: JP H4-506530A
Patent Document 2: JP H6-509130A

DISCLOSURE OF THE INVENTION

The present invention was arrived at in light of the above matters, and it is an object thereof to provide an aqueous resin composition that can provide excellent properties using a high molecular weight resin, and also that does not require a complicated production procedure.

The inventors of the present application performed intense investigation regarding the foregoing issue, and found that it is possible to solve the foregoing issue by mixing an acid-modified chlorinated polyolefin with an average molecular weight of 37,000 to 150,000, a surfactant, a glycol ether-based compound that satisfies general formula (1) shown below, and water, while heating, and then adding a predetermined amount of a basic compound and dispersing the resin. Based on this finding, the present invention has been accomplished.

In other words, the present invention provides an aqueous resin composition that is formed by heating and dissolving 100 parts by mass of acid-modified chlorinated polyolefin with an average molecular weight of 37,000 to 150,000 in the presence of 2 to 30 parts by weight of a surfactant, 10 to 50 parts by mass of a glycol ether-based compound that satisfies general formula (1) shown below, and 150 to 425 parts by mass of water, and then dispersing this with a basic compound that has been added at a ratio of 1 to 4 chemical equivalents per carboxyl group of the acid-modified chlorinated polyolefin.

$$C_4H_9-(OCH_2CH_2)_n-OH \qquad \text{General Formula (1)}$$

n: an integer from 1 to 4

BEST MODE FOR CARRYING OUT THE INVENTION

The present invention is described in detail below.

As regards the acid-modified chlorinated polyolefin resin that is used in the present invention, it is possible to use a resin that is obtained by first graft-copolymerizing at least one species selected from an $\alpha,\beta$-unsaturated carboxylic acid and anhydrides thereof with at least one species selected from among polypropylene and a propylene-$\alpha$-olefin copolymer to obtain an acid-modified polyolefin, and then chlorinating that acid-modified polyolefin. As used herein, the propylene-$\alpha$-olefin copolymer is a copolymer obtained by copolymerizing propylene as the main component with $\alpha$-olefin. Examples of $\alpha$-olefins include $\alpha$-olefins with 2 or 4 to 20 carbon atoms, such as ethylene, 1-butene, 1-pentene, 1-hexene, 1-heptene, 1-octene, 1-decene, 1-dodecene, 1-hexadecene, and 4-methyl-1-pentene. The propylene content of the propylene-$\alpha$-olefin copolymer is preferably not less than 50 mol %. When the content of the propylene component is less than 50 mol %, the adherence to polypropylene base becomes poor.

Examples of the $\alpha,\beta$-unsaturated carboxylic acid and acid anhydrides thereof that are graft-polymerized with the polypropylene and the propylene-$\alpha$-olefin copolymer include maleic acid, maleic anhydride, fumaric acid, citraconic acid, citraconic anhydride, mesaconic acid, itaconic acid, itaconic anhydride, aconitic acid, aconitic anhydride, and himic anhydride. Of these, maleic anhydride and itaconic anhydride are preferable.

The content of the $\alpha,\beta$-unsaturated carboxylic acid and acid anhydride component thereof in the acid-modified chlorinated polyolefin is preferably 0.4 to 10 mass %. When the content is over 10 mass %, the hydrophilicity of the resin is high and there is a risk that the water-resistance of the coating film that is obtained from the target composition will be poor. On the other hand, dispersion of the resin becomes difficult when the content is less than 0.4 mass %.

As the method of graft-copolymerization of at least one species selected from $\alpha,\beta$-unsaturated carboxylic acids and anhydrides thereof with a polyolefin, well-known methods can be used, such as the method of heating and melting the polyolefin to not less than its melting point in the presence of a radical generator in order to effect the reaction (melting method), and the method of dissolving the polyolefin in an organic solvent and then heating and mixing the two in the presence of a radical generator in order to effect the reaction (solution method).

Next, the acid-modified polyolefin that is obtained by the above method is chlorinated to obtain an acid-modified chlorinated polyolefin.

The chlorination can be performed by, for example, dissolving the acid-modified polyolefin in a chlorine-based solvent and then infusing chlorine gas in the presence or absence of a radical generator until the chlorine content reaches 10 to 35 mass %.

The chlorine content of the acid-modified chlorinated polyolefin is preferably 10 to 35 mass %. When the content is less than 10 mass %, the resin solubility is poor and thus dispersion becomes difficult. When the content is greater than 35 mass %, the adherence is poor.

The weight-average molecular weight of the acid-modified chlorinated polyolefin is preferably 37,000 to 150,000. When the weight-average molecular weight is less than 37,000, the adherence is poor. When the weight-average molecular weight is greater than 150,000, the resin solubility is poor and thus dispersion becomes poor. It should be noted that the weight-average molecular weight can be measured by GPC (gel permeation chromatography).

The surfactant that is used in the present invention can be a nonionic surfactant, an anionic surfactant, a cationic surfactant, or an amphoteric surfactant. Of these, the use of a nonionic surfactant or an anionic surfactant is preferable in terms of the particle size of the dispersed particles and the water-resistance of the coating film that is obtained from the target composition, and the use of a nonionic surfactant is particularly preferable.

Examples of the nonionic surfactant include polyoxyethylene alkyl ether, polyoxypropylene alkyl ether, polyoxyethylene alkyl phenyl ether, polyoxypropylene alkyl phenyl ether, polyoxyethylene styrenated phenyl ether, polyoxypropylene styrenated phenyl ether, polyoxyethylene fatty acid ester, polyoxypropylene fatty acid ester, polyoxyethylene sorbitan fatty acid ester, polyoxypropylene sorbitan fatty acid ester, polyoxyethylene alkyl amine ether, polyoxypropylene alkyl amine ether, polyoxyethylene lanolin alcohol ether, polyoxypropylene lanolin alcohol ether, polyoxyethylene lanolin fatty acid ester, polyoxypropylene lanolin fatty acid ester, and (polyoxyethyleneoxypropylene) block copolymer.

Examples of anionic surfactants include higher alkyl sulfuric acid esters, alkyl aryl polyoxyethylene sulfuric acid ester salts, higher fatty acid salts, alkyl aryl sulfonic acid salts, and alkyl phosphonic acid ester salts.

These surfactants can be used alone as a single species or in combination of two or more species.

The surfactant that is used in the present invention is used in an amount of 2 to 30 parts by mass per 100 parts by mass of the acid-modified chlorinated polyolefin. When the amount is less than 2 parts by mass, dispersion of the resin becomes difficult. On the other hand, when the amount is greater than 30 parts by mass, the water-resistance of the target composition is poor.

The glycol ether-based compound satisfying the general formula (1) that is used in the present invention is used in an amount of 10 to 50 parts by mass per 100 parts by mass of the acid-modified chlorinated polyolefin. When the amount is below 10 parts by mass, dispersion of the resin becomes difficult. On the other hand, when the amount is greater than 50 parts by mass, drying of the target composition may require a high temperature and a longer length of time. Further, the original objective of dispersing the compound in an aqueous medium can be lost.

Examples of the glycol ether-based compound that satisfies general formula (1) include ethylene glycol mono-n-butyl ether, ethylene glycol mono-iso-butyl ether, ethylene glycol mono-tert-butyl ether, diethylene glycol mono-n-butyl ether, diethylene glycol mono-iso-butyl ether, triethylene glycol mono-n-butyl ether, and tetraethylene glycol mono-n-butyl ether.

These compounds can be used as a single species or in combination of two or more species.

In this invention, a basic compound is necessary to disperse the acid-modified chlorinated polyolefin. The dispersibility of the acid-modified chlorinated polyolefin can be increased by having a basic compound present in the system. Examples of the basic compound include: inorganic basic compounds such as sodium hydroxide, potassium hydroxide, sodium carbonate, potassium carbonate, and ammonium carbonate; amines such as triethylamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, methyhminobispropylamine, 3-methoxypropylamine, monoethanolamine, diethanolamine, triethanolamine, morpholine, N-methylmorpholine, N-ethylmorpholine, 2-amino-2-methyl-1-propanol, and 2-dimethylamino-2-methyl-1-propanol; and ammonium.

The amount of the basic compound that is added is preferably 1 to 4 chemical equivalents per carboxyl group of the acid-modified chlorinated polyolefin. When the amount is less than 1 chemical equivalent, dispersion becomes difficult. When the amount is greater than 4 chemical equivalents, there is a risk that too much will remain in the dried target compound. The amount of water that is used when dispersing the acid-modified chlorinated polyolefin is 150 to 425 parts by mass. When the amount is less than 150 parts by mass, dispersion becomes difficult. On the other hand, when the amount is greater than 425 parts by mass, drying of the target composition may require high temperatures and a longer length of time.

The aqueous resin composition of the present invention is produced by heating to dissolve 100 parts by mass of the acid-modified chlorinated polyolefin in the presence of 2 to 30 parts by mass of the surfactant, 10 to 50 parts by mass of the glycol ether-based compound that satisfies general formula (1), and 150 to 425 parts by mass of water, and then adding the basic compound at a ratio of 1 to 4 chemical equivalents per the carboxyl group of the acid-modified chlorinated polyolefin.

The temperature when heating to dissolve the acid-modified chlorinated polyolefin in the presence of the surfactant, the glycol ether-based compound that satisfies general formula (1), and water is 80 to 130° C., and preferably 100 to 120° C.

Next, the basic compound is added to the above dissolved material to disperse the resin. The temperature when adding the basic compound is preferably 80 to 100° C.

Once the basic compound has been added, it is necessary to stir while heating in order to sufficiently disperse the resin. The temperature when stirring is preferably 80 to 100° C. The stirring time is 1 to 6 hours, preferably 2 to 4 hours.

The aqueous resin dispersion composition of the present invention can be used as obtained, or can be mixed with pigment, or it can be further blended with other aqueous resins.

The aqueous resin dispersion composition of the present invention has an excellent ability to tightly adhere to polyolefin-based resins, and thus it is useful as the primer when coating or adhering, or is useful in coating and adhesive applications.

With the present invention, it is possible to provide an aqueous resin composition that has excellent properties using a high molecular weight resin. This aqueous resin composition can be obtained without requiring special equipment or complicated processing steps, and thus is useful in industrial applications.

EXAMPLES

Next, the present invention is described in specific terms through examples, but the present invention is not limited by these examples.

In the description below, measurement of the mean particle size was carried out using Zetasizer Nano ZS, available from MALVERN, serving as a laser diffraction-type particle size distribution measurement device.

Production Example 1

Isotactic polypropylene 280 g, maleic anhydride 13 g, di-tert-butyl peroxide 5.6 g, and toluene 420 g were placed into an autoclave with attached agitator and nitrogen substitution was performed for approximately 5 minutes, after which they were reacted at 140° C. for 5 hours while heating and stirring. After the reaction was over, the reaction solution was introduced into a large quantity of methyl ethyl ketone to precipitate the resin. This resin was further washed several times with methyl ethyl ketone to remove unreacted maleic anhydride. The resin was then dried under reduced pressure, and 280 g of the maleic anhydride-modified polyolefin that was obtained and 2520 g chloroform were placed in the autoclave with attached agitator, nitrogen substitution was performed for approximately 5 minutes, and then the resin was heated to 110° C. to dissolve it sufficiently. Next, 1.4 g tert-butyl peroxy-2-ethylhexanoate was added and chloride gas was blown onto this. After a predetermined amount of chlorine had been introduced, the reaction solvent chloroform was removed to a certain degree under reduced pressure, and tert-butylphenylglycidylether was added as a stabilizer to this highly concentrated solution in an amount of 5% of the solid content. This solution was dried under reduced pressure to completely remove the chloroform, yielding a solid maleic anhydride-modified chlorinated polyolefin with a chlorine content of 26 mass %, a total content of maleic anhydride component and maleic acid component of 1.0 mass %, and a weight-average molecular weight of 143,000.

Production Example 2

Other than using propylene-ethylene copolymer (ethylene component content=5 mol %) 280 g, maleic anhydride 80 g, di-tert-butyl peroxide 5.6 g, and toluene 420 g, a solid maleic anhydride-modified chlorinated polyolefin with a chlorine content of 14 mass %, a total content of maleic anhydride component and maleic acid component of 5.2 mass %, and a weight-average molecular weight of 37,000 was obtained in the same manner as in Production Example 1.

Working Example 1

Production of Aqueous Resin Composition (a)

Two hundreds g of the acid-modified chlorinated polyolefin obtained in Production Example 1, 50 g of diethylene glycol mono-n-butyl ether, 30 g of polyoxyethylene styrene phenyl ether (available from Daiichi Kogyo Seiyaku Co., Ltd., product name: Noigen EA-197, nonionic surfactant), and 480 g of deionized water were introduced into a 1 liter, four-mouth flask furnished with a cooler, a thermometer, and a stirrer, and this was maintained at 100° C. in order to sufficiently dissolve the resin. To this solution was added 5 g of N,N-dimethylethanolamine. This was stirred for two hours and then cooled, yielding an aqueous resin composition (a) with a resin concentration (solid content) of 30 mass % and a 82 nm mean particle size.

Working Example 2

Production of Aqueous Resin Composition (b)

An aqueous resin composition (b) with a resin concentration (solid portion) of 30 mass % and a mean resin particle size of 68 nm was obtained in the same manner as in Working Example 1, except that the amount of each component was changed to the composition of Table 1.

Comparative Example 1

Production of Aqueous Resin Composition (c)

An aqueous resin composition (c) with a resin concentration (solid content) of 30 mass % and a mean particle size of 30 nm was obtained in the same manner as in Working Example 1, except that the amount of each component was changed to the composition of Table 1.

Comparative Example 2

Production of Aqueous Resin Composition (d)

Production of an aqueous resin composition (d) in the same manner as in Working Example 1 was attempted with the quantities of each component changed to the composition of Table 1. However, the small amount of glycol ether per the acid-modified chlorinated polyolefin did not permit dispersion to occur.

TABLE 1

| | | Working Example 1 | Working Example 2 | Comparative Example 1 | Comparative Example 2 |
|---|---|---|---|---|---|
| Aqueous resin composition | | (a) | (b) | (c) | (d) |
| Acid-modified chlorinated polyolefin [g] | Production Example 1 | 200 | | | 200 |
| | Production Example 2 | | 200 | 200 | |
| Diethylene glycol mono-n-butyl ether [g] | | 50 | | | 16 |
| Ethylene glycol mono-n-butyl ether [g] | | | 30 | 30 | |
| Noigen EA-197 [g] | | 30 | | | 60 |
| DKS NL-180[1] [g] | | | 4 | 70 | |
| Deionized water [g] | | 480 | 420 | 580 | 580 |
| N,N-dimethylethanolamine [g] | | 5 | 20 | 20 | 5 |
| Mean particle size [nm] | | 82 | 68 | 30 | No dispersion |

[1] Polyoxyethylene lauryl ether (nonionic surfactant, available from Daiichi Kogyo Seiyaku Co., Ltd.)

The aqueous resin compositions (a) through (c) thus obtained were evaluated as follows. The results are shown in Table 2.

Adherence

Superflex 150HS (polyurethane emulsion available from Daiichi Kogyo Seiyaku Co., Ltd., solid content: 38 mass %)

in an amount of 80 g was added to 25 g of the aqueous composition, then 2 g dipropylene glycol monomethyl ether was added as a film formation aid and 1 g of Surfynol 420 (available from Air Products Japan, Inc.) was added as a wetting agent, and this was stirred for 30 minutes by magnetic stirrer. The emulsion was sprayed onto a polypropylene plate (formed by press molding SB-E3 available from Mitsui Noblen by a conventional method, 100 mm×50 mm, 2 mm thick) having been washed with isopropyl alcohol such that the dried film had a thickness of 20 to 25 μm. This was heated at 60° C. for 10 minutes, then a two-component urethane coating material was applied and dried for 20 minutes at 90° C. This was allowed to stand for 24 hours in a 25° C.×60% RH atmosphere, forming the test plate. In the test plate, 100 square divisions extending to the base were formed at a 1 mm spacing, and cellophane tape was bonded thereto and pulled off at an angle of 90° with respect to the coating surface, and the number of remaining square divisions was counted.

Water Resistance

The test plate obtained by the above method was immersed in 40° C. warm water for 240 hours, and then 100 square divisions were made in the same manner as in the above test to evaluate adherence and the same test was performed again.

Storage Stability

Eighty g of the aqueous resin composition was sealed in a 100-mL container and left undisturbed for two weeks in a 500° C. atmosphere, and the change in its viscosity was assessed based on the following testing standards.

Open Circle: slight increase in viscosity (viscosity not more than twice the initial viscosity)

X-Mark: increase in viscosity (rise in viscosity being not less than twice the initial viscosity)

TABLE 2

| | Aqueous resin composition | Evaluated item | | |
|---|---|---|---|---|
| | | Adherence | Water resistance | Storage stability |
| Working Example 1 | (a) | 100 | 100 | ○ |
| Working Example 2 | (b) | 100 | 100 | ○ |
| Comparative Example 1 | (c) | 100 | Blistering occurred | ○ |

It can be understood from Table 2 that the aqueous resin compositions (a) and (b) according to the present invention exhibit good adherence, and also have excellent water resistance and storage stability.

In contrast, the aqueous resin composition (c), in which the ratio of acid-modified chlorinated polyolefin and surfactant is outside the range of the present invention and the quantity of surfactant is large, is lacking in water resistance.

INDUSTRIAL APPLICABILITY

The aqueous resin composition containing polyolefin resin can be used as ink, adhesive, aqueous coating material, floor polish, fiber processing agent, paper processing agent, mold releasing agent, and various binders.

The invention claimed is:

1. A method of producing an aqueous resin composition, comprising:
    a first step of mixing
      (a) 100 parts by mass of acid-modified chlorinated polyolefin with a weight-average molecular weight of 37,000 to 150,000,
      (b) 2 to 30 parts by mass of a surfactant,
      (c) 10 to 50 parts by mass of a glycol ether-based compound that satisfies $C_4H_9$—$(OCH_2CH_2)_n$—OH (Formula (1)) wherein n is an integer from 1 to 4, and
      (d) 150 to 425 parts by mass of water
    to obtain a mixture;
    a second step of heating the mixture;
    a third step of adding (e) a basic compound to the mixture obtained by the second step at a ratio of 1 to 4 chemical equivalents per carboxyl group of the acid-modified chlorinated polyolefin;
    and a fourth step of mixing the mixture obtained by the third step;
    wherein (e) the basic compound is at least one member selected from the group consisting of sodium hydroxide, potassium hydroxide, sodium carbonate, potassium carbonate, ammonium carbonate, triethylamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, methyliminobispropylamine, 3-methoxypropylamine, monoethanolamine, diethanolamine, triethanolamine, morpholine, N-methylmorpholine, N-ethylmorpholine, 2-amino-2-methyl-1-propanol, 2-dimethylamino-2-methyl-1-propanol, and ammonia.

2. The method of claim 1, wherein the acid-modified chlorinated polyolefin is produced by
    (i) obtaining an acid-modified polyolefin by graft-copolymerizing at least one species selected from the group consisting of α,β-unsaturated carboxylic acids and anhydrides thereof in an amount of 0.6 to 10 mass % with at least one species selected from the group consisting of polypropylene and a propylene-α-olefin copolymer, and
    (ii) chlorinating the acid-modified polyolefin.

3. The method of claim 1, wherein the chlorine content of the acid-modified chlorinated polyolefin is 10 to 35 mass %.

* * * * *